United States Patent
Kato (10) Patent No.: US 7,327,892 B2
(45) Date of Patent: Feb. 5, 2008

(54) JPEG2000 ENCODER

(75) Inventor: Yasuyuki Kato, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 544 days.

(21) Appl. No.: 11/053,240

(22) Filed: Feb. 9, 2005

(65) Prior Publication Data

US 2006/0083433 A1    Apr. 20, 2006

(30) Foreign Application Priority Data

Oct. 14, 2004    (JP)    ............................ 2004-300270

(51) Int. Cl.
*G06K 9/36*    (2006.01)
*G06K 9/46*    (2006.01)

(52) U.S. Cl. ...................... 382/232; 382/236; 382/245; 382/246; 382/250; 382/251; 348/404.1; 348/407.1

(58) Field of Classification Search .............. 382/232, 382/236, 245, 246, 247, 248, 240, 250, 251, 382/253; 348/404.1, 404.7, 409.1, 410.1, 348/418.1, 421.1; 375/240.02, 240.03, 240.08, 375/240.14, 240.16
See application file for complete search history.

(56) References Cited

U.S. PATENT DOCUMENTS

| 5,416,521 | A | * | 5/1995 | Chujoh et al. | .......... 375/240.14 |
| 2003/0185303 | A1 | * | 10/2003 | Hall et al. | ............. 375/240.16 |
| 2005/0094870 | A1 | * | 5/2005 | Furukawa et al. | .......... 382/155 |
| 2005/0265617 | A1 | * | 12/2005 | Fukuhara et al. | ........... 382/240 |
| 2006/0146934 | A1 | * | 7/2006 | Caglar et al. | .......... 375/240.12 |

FOREIGN PATENT DOCUMENTS

| JP | 2001-045485 | 2/2001 |
| JP | 2001-258034 | 9/2001 |
| JP | 2001-309381 | 11/2001 |

* cited by examiner

*Primary Examiner*—Matthew C. Bella
*Assistant Examiner*—Ali A. B Bayat
(74) *Attorney, Agent, or Firm*—Arent Fox, LLP.

(57) ABSTRACT

The image quality value of the code block currently processed is monitored, and when it falls below a threshold, encoding of the code block is terminated (in other words, encoding in the subsequent passes is omitted for the code block) to shift to encoding of the next code block.

12 Claims, 9 Drawing Sheets

| COM-PRESSION RATIO (%) | SAMPLE IMAGE | | | | | | | |
|---|---|---|---|---|---|---|---|---|
| | 1 | 2 | 3 | 4 | 5 | 6 | 7 | 8 |
| 100 | 16.8 | 21.1 | 18.1 | 18.1 | 19.4 | 16.0 | 20.1 | 20.8 |
| 20 | 14.2 | 12.2 | 15.5 | 13.2 | 15.5 | 16.0 | 12.5 | 12.7 |
| 10 | 10.1 | 7.4 | 9.9 | 9.2 | 10.2 | 10.8 | 8.2 | 7.6 |
| 5 | 7.1 | 5.0 | 7.0 | 6.7 | 6.8 | 7.8 | 5.7 | 5.2 |

FIG.7

| COM-PRESSION RATIO (%) | SAMPLE IMAGE | | | | | | | | AVER-AGE |
|---|---|---|---|---|---|---|---|---|---|
| | 1 | 2 | 3 | 4 | 5 | 6 | 7 | 8 | |
| 20 | 0.8 | 0.6 | 0.9 | 0.7 | 0.8 | 1.0 | 0.6 | 0.6 | 0.8 |
| 10 | 0.6 | 0.4 | 0.5 | 0.5 | 0.5 | 0.7 | 0.4 | 0.4 | 0.5 |
| 5 | 0.4 | 0.2 | 0.4 | 0.4 | 0.4 | 0.5 | 0.3 | 0.3 | 0.3 |

JPEG2000 ENCODER

CROSS-REFERENCE TO RELATED APPLICATIONS

This application is based upon and claims the benefit of priority from the prior Japanese Patent Application No. 2004-300270, filed on Oct. 14, 2004, the entire contents of which are incorporated herein by reference.

BACKGROUND OF THE INVENTION

1) Field of the Invention

The present invention relates to a Joint Photographic Experts Group (JPEG) 2000 encoder that can encode motion pictures efficiently.

2) Description of the Related Art

The JPEG2000, which is standardized in January 2001 by the JPEG, being a joint organization of International Organization for Standardization (ISO) and International Telecommunications Union Telecommunication Standardization Sector (ITU-TS), is well known by the fact that it makes a block distortion in an image data with high compression ratio inconspicuous by replacing discrete cosine transform (DCT) employed by the conventional JPEG with discrete wavelet transform (DWT).

Figure 1:
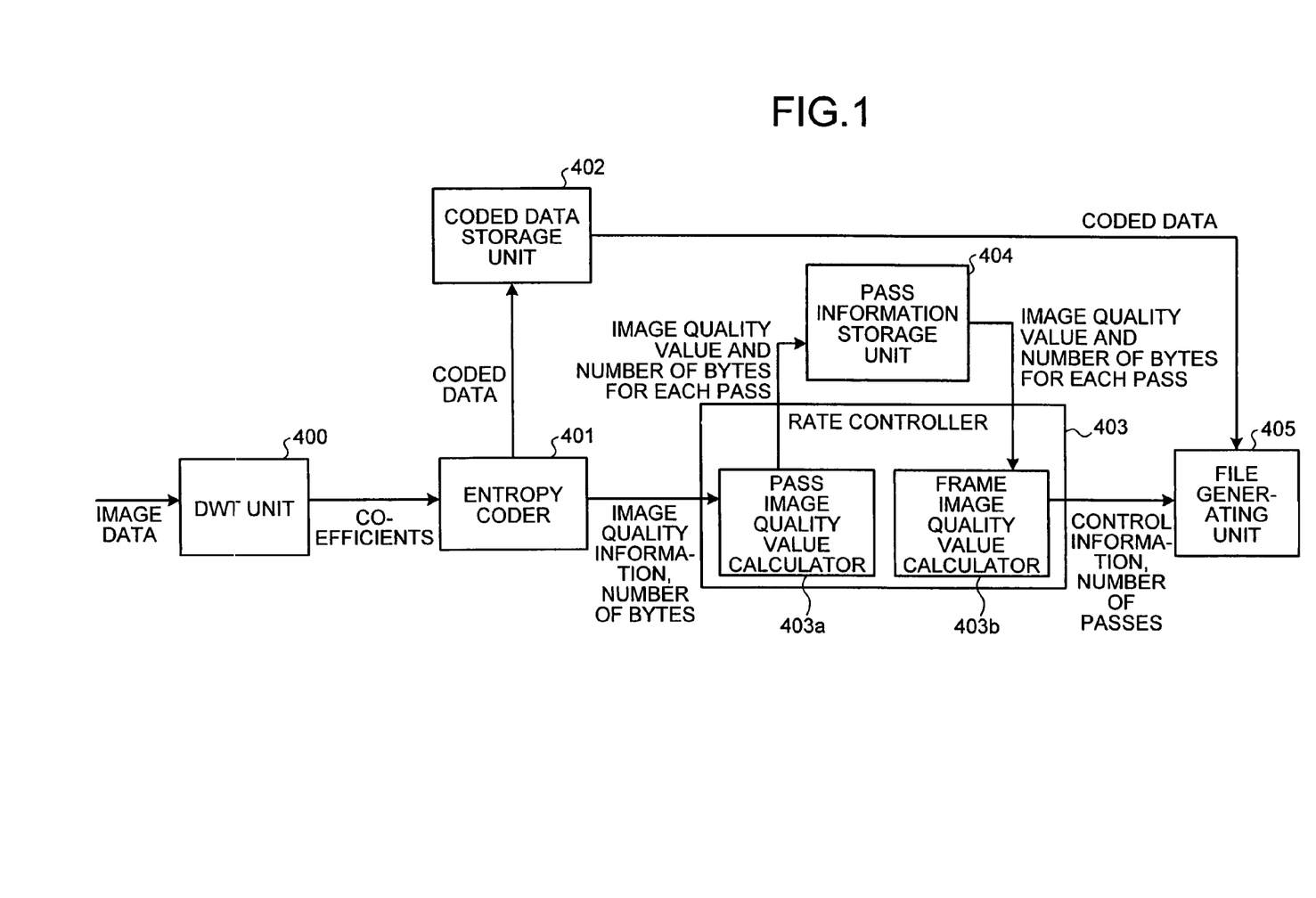
FIG. 1 is a schematic for explaining a functional configuration of a conventional JPEG2000 encoder.

FIG. 1 is a schematic for explaining a functional configuration of a conventional JPEG2000 encoder (an image processing apparatus that encodes image data based on the JPEG2000). The image data subjected to pre-processing (such as DC level shift and component transform) is divided into a plurality of tiles, and the DWT is performed by a discrete wavelet transform (DWT) unit 400 for each tile.

An entropy coder 401 divides a set of coefficients of each tile obtained by the DWT into a plurality of code blocks, converts each code block into bit plane format, and encodes the bits in each bit plane in three passes of:

(1) significance propagation pass (SP);
(2) magnitude refinement pass (MRP); and
(3) clean up pass (CP), from the most significant bit toward the least significant bit.

These passes have a function of classifying each bit in the code block corresponding to the contribution to the image quality. For example, (1) is a pass for selectively picking out a bit having large contribution to the image quality and encoding the bit. Likewise, (2) is a pass for encoding a bit having intermediate contribution and (3) is a pass for encoding a bit having small contribution. In coded data output from the entropy coder 401 to a coded data storage unit 402, bits of each code block are sorted in the order of from the higher bit plane to the lower bit plane, and in each bit plane, sorted in the order of from (1), (2), and (3).

Therefore, by truncating coded data from the end of each code block, the code amount can be adjusted to a predetermined value, while suppressing deterioration of the image quality (Rate-Distortion method). Control of the code amount is required particularly for motion pictures (the JPEG2000 is a standard targeting not only still pictures but also motion pictures) whose code amounts are apt to become large.

A rate controller 403 specifies number of passes for each code block, when code amount of one frame (one image) is a certain value. That is, a pass image quality value calculator 403a of the rate controller 403 calculates an image quality value of each pass coded by the entropy coder 401, and stores the value in a pass information storage unit 404 together with the number of bytes of each pass. When the processing has finished for all code blocks in one frame, a frame image quality value calculator 403b of the rate controller 403 calculates an image quality value of the frame when the code amount of the frame is set to a certain value (hereinafter, "target code amount").

Figure 3:
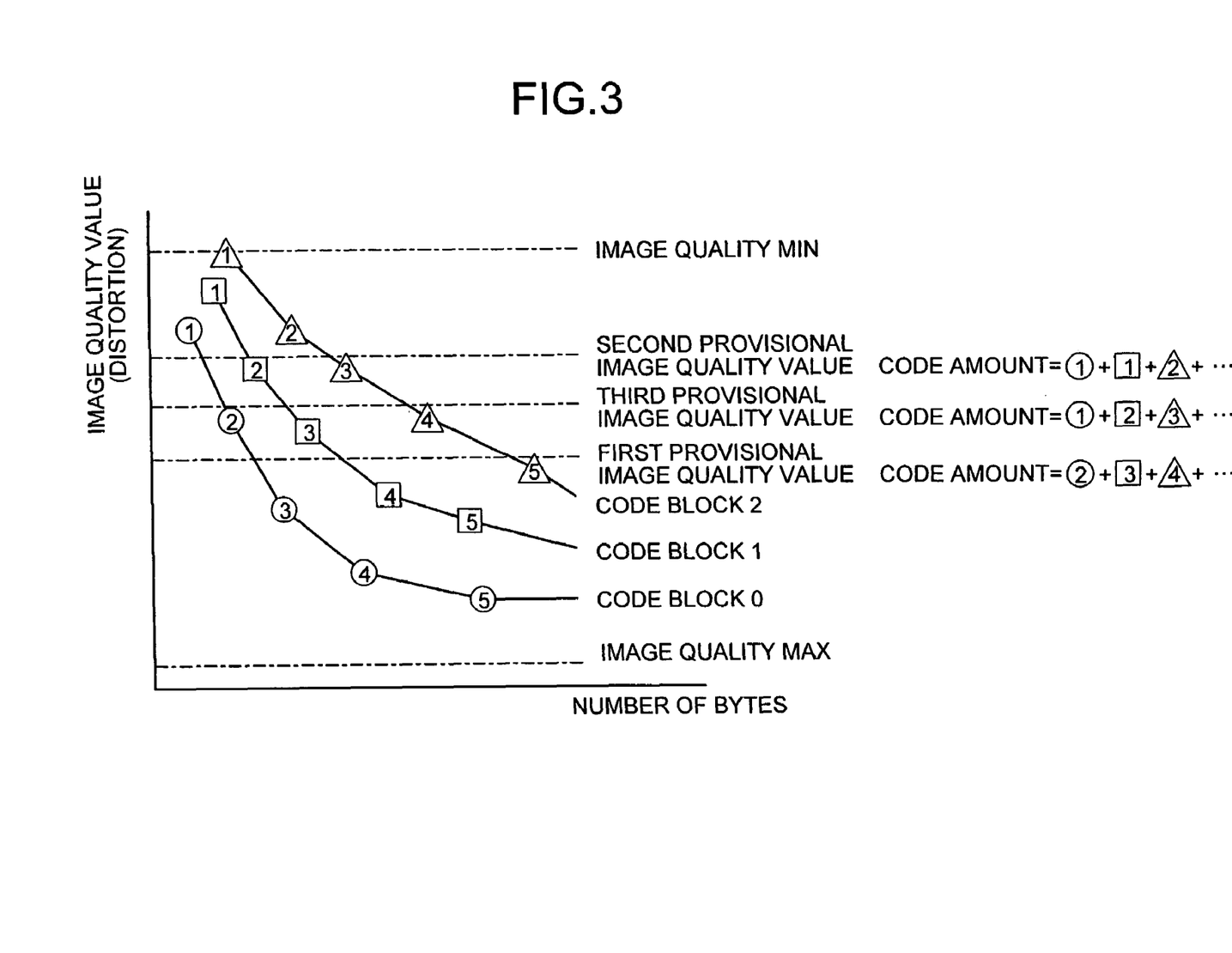
FIG. 3 is a graph for explaining the principle of calculation of an image quality value of a frame by the conventional JPEG2000 encoder.

For this calculation, the graph shown in FIG. 3 is used conceptually. In the example shown in FIG. 3, a block distortion value is used as the image quality value. In this case, the larger the value, the worse the image quality is, and the smaller the value, the better the image quality is. In FIG. 3, the image quality value and the number of bytes at a position of pass 2 of code block 0, indicate the image quality value and the number of bytes of the code block 0 realized when passes up to pass 2 are left and pass 3 and after are truncated in the code block 0.

Therefore, when the image quality value of the currently processed frame (hereinafter, "current frame") is provisionally set at a midpoint (in FIG. 3, "first provisional image quality value") between the maximum image quality value ("image quality Max") and the minimum image quality value ("image quality Min"), the first provisional image quality value will be achieved by leaving passes up to pass 3 in code block 0, up to pass 4 in code block 1, and up to pass 5 in code block 2. In this case, the code amount of one frame becomes the sum total of the code amounts of each code block in the frame, such as (the code amount of code block 0 in which passes only up to pass 3 are left)+(the code amount of code block 1 in which passes only up to pass 4 are left)+(the code amount of code block 2 in which passes only up to pass 5 are left).

When the code amount of one frame is not close to the target code amount, for example too much, the provisional image quality value is increased, for example, to a midpoint between the image quality Min and the first (previous) provisional image quality value (in FIG. 3, "second provisional image quality value"), to calculate the code amount again. As shown in FIG. 3, the code amount for one frame in this case becomes the sum total of (the code amount of code block 0 in which passes only up to pass 2 are left)+(the code amount of code block 1 in which passes only up to pass 3 are left)+(the code amount of code block 2 in which passes only up to pass 3 are left).

When the code amount is still not close to the target code amount, for example too small, the provisional image quality value is decreased, for example, to a midpoint between the first provisional image quality value and the second provisional image quality value (in FIG. 3, "third provisional image quality value"), to calculate the code amount again. Thus, by the binary searching method, the image quality value of the frame to make the code amount of the frame closest to the target code amount is calculated. Then, a truncation point in each code block to achieve the calculated image quality value is calculated.

When truncation points of all code blocks in one frame are determined, a file generating unit 405 in FIG. 1 generates a JPEG2000 file with only the number of passes informed for each code block from the frame image quality value calculator 403b of the rate controller 403. For example, when 2 is informed as the number of passes for code block 0, the coded data in pass 3 and thereafter in code block 0 are truncated.

Figure 4:
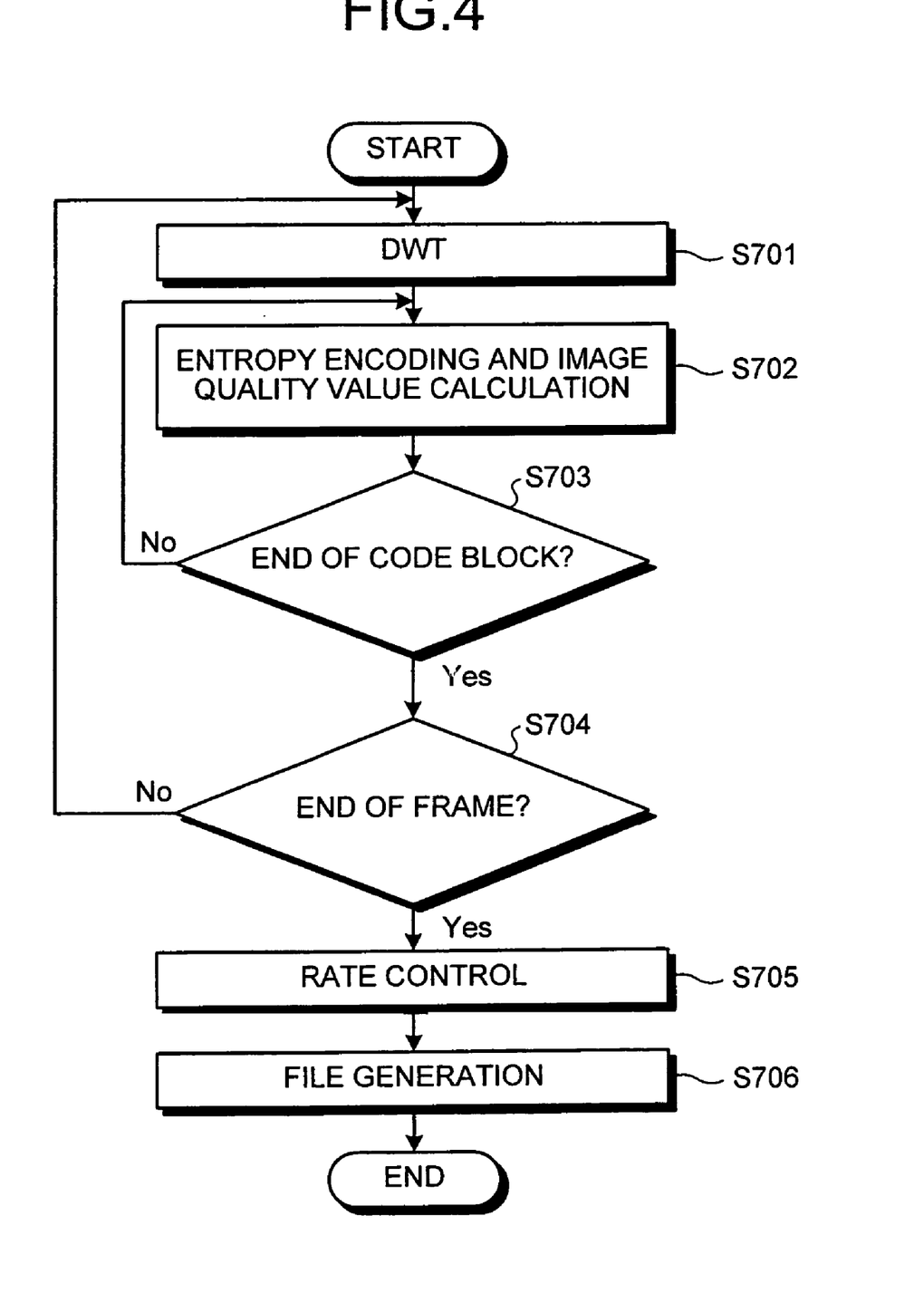
FIG. 4 is a flowchart of a procedure in encoding processing of image data by the conventional JPEG2000 encoder.

FIG. 4 is a flowchart of a procedure in encoding processing of the image data by the conventional JPEG2000 encoder. The image data after pre-processing is transformed by the DWT unit 400 (step S701). The transformed data (coefficients) is then divided into code blocks by the entropy coder 401, and bits in each bit plane in each code block is encoded in each pass and stored in the coded data storage unit 402. At the same time, the pass image quality value calculator 403a of the rate controller 403 calculates the image quality value of each pass, and the calculated image quality value is stored in the pass information storage unit 404 together with the number of bytes of each pass (step S702).

After finishing the processing at step S702 for all passes in one code block (step S703: Yes), similar processing is performed for the next code block. After finishing the processing at steps S701 to S703 for all code blocks in one frame (step S704: Yes), the frame image quality value calculator 403b of the rate controller 403 performs rate control (step S705) to specify the image quality value of the current frame to make the code amount of the frame closest to the target code amount; and number of passes to be left in each code block to achieve the image quality value.

The file generating unit 405 then generates the JPEG2000 file (step S706) in which only the passes determined to be left at step S705 are incorporated.

Figure 5:
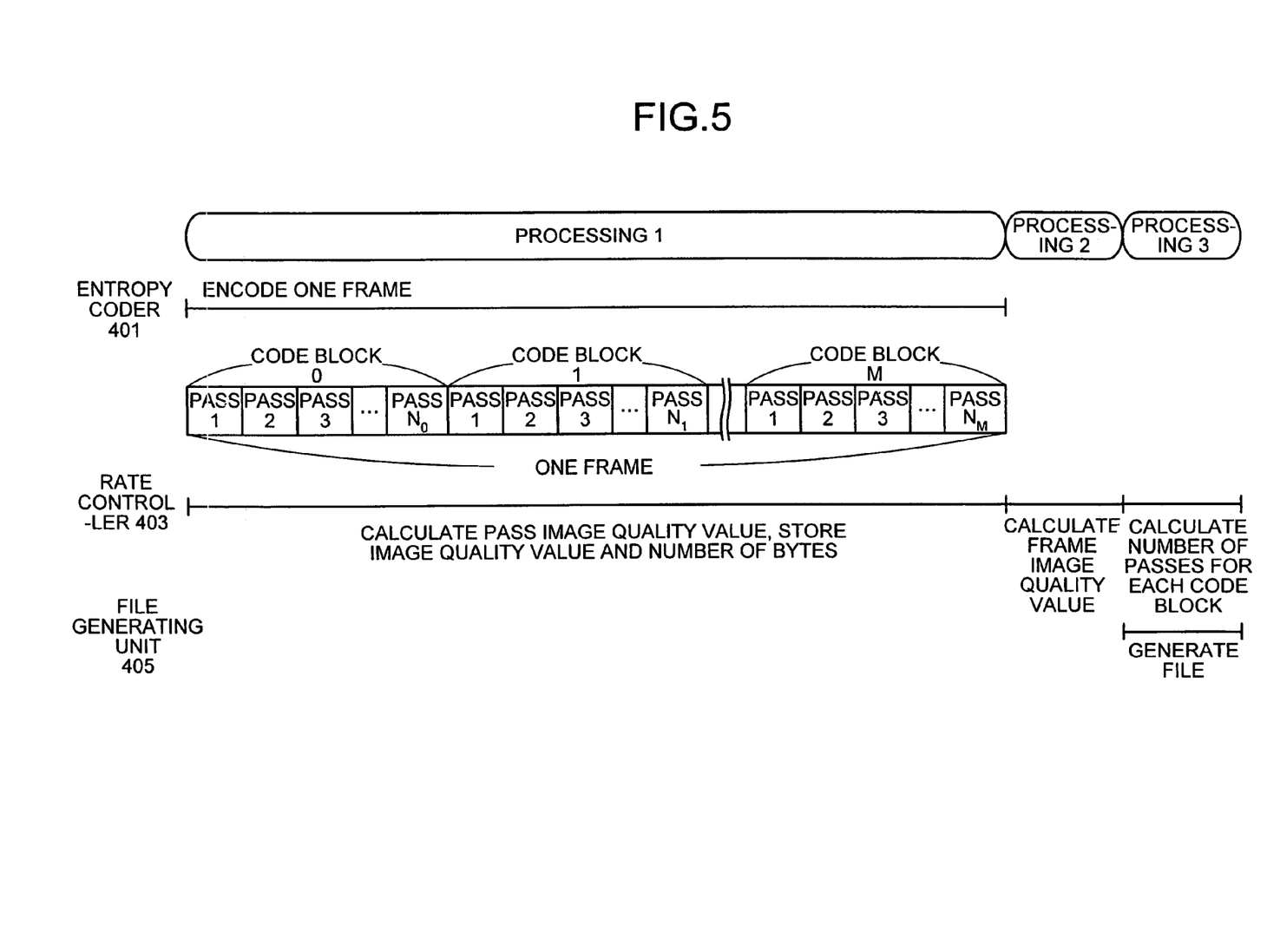
FIG. 5 is a timing chart of the encoding processing of image data in the conventional JPEG2000 encoder.

FIG. 5 is a timing chart of the encoding processing of the image data in the conventional JPEG2000 encoder. The processing is roughly divided into three processing. In processing 1, the entropy coder 401 encodes each code block of one frame in each pass, and the rate controller 403 calculates the image quality value of each pass, and stores the image quality value in the pass information storage unit 404 together with the number of bytes of each pass. When the processing 1 has finished for one frame, the rate controller 403 calculates an image quality value which makes the code amount closest to the target code amount (processing 2), and also calculates number of passes to be left in each code block, and the file generating unit 405 generates the file based on the result thereof (processing 3).

Thus, according to the JPEG2000, a part of the image data (specifically, a bit having little influence to the image quality) is truncated, thereby adjusting the code amount to a predetermined value, while suppressing deterioration of the image quality. The conventional technology for suppressing the generated code amount includes the ones disclosed in Japanese Patent Application Laid-open Nos. 2001-258034, 2001-309381 and 2001-45485, other than the method described above.

However, in the conventional art explained above, the entropy coder 401 encodes not only passes that are not truncated but also passes that are eventually truncated by the file generating unit 405. Therefore, as the number of passes truncated in the latter processing increases, the former processing becomes inefficient.

Figure 6:
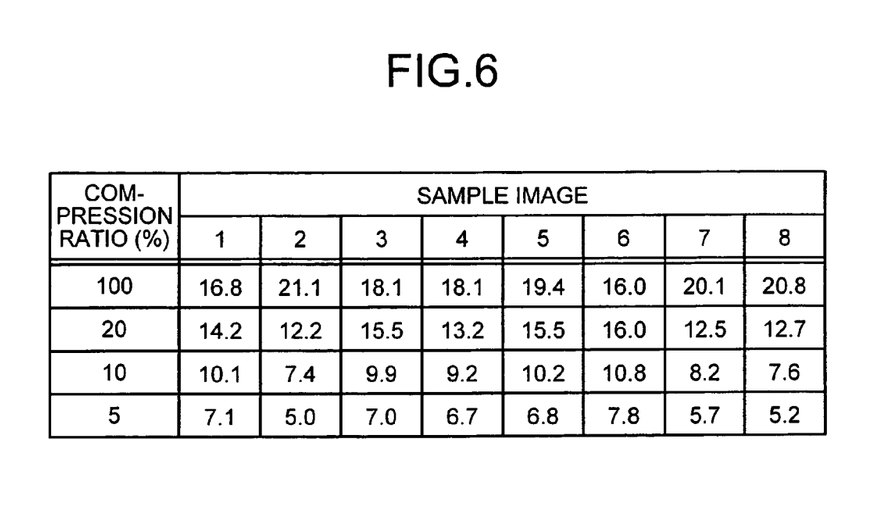
FIG. 6 is a graph of an example of how many passes are averagely truncated per one code block after encoding.
Figure 7:
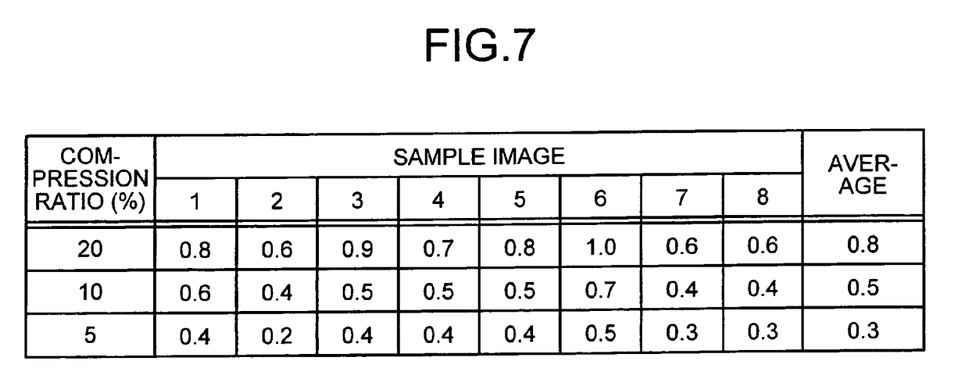
FIG. 7 is a graph in which each value in FIG. 6 converted into a ratio to a relevant value of when the compression ratio is 100%.

For example, FIG. 6 is a graph of an example of how many passes are averagely truncated per one code block after encoding. For example, when the compression ratio is 100% (that is, no compression), in sample image 1, an average of 16.8 passes has been truncated per one code block. FIG. 7 is a graph in which each value in FIG. 6 converted into a ratio to a relevant value of when the compression ratio is 100%. As for sample image 3, for example, the number of passes to be truncated when the compression ratio is 10% is about half the number of passes to be truncated when the compression ratio is 100%. Thus, the number of passes to be truncated decreases as the image is compressed more compact. In other words, as the image is not compressed so much, more encoded passes are eventually truncated, which causes inefficiency of processing.

SUMMARY OF THE INVENTION

It is an object of the present invention to at least solve the problems in the conventional technology.

An image processing apparatus according to an aspect of the present invention is an image processing apparatus that encodes each frame in an image data according to JPEG2000, and includes a dividing unit that divides each frame into a plurality of blocks; an encoder that encodes bits in each block in a plurality of passes; a first image quality value calculator that calculates an image quality value of each pass; a second image quality value calculator that calculates an image quality value of each block based on the image quality value of each pass; and an encoder controller that makes the encoder skip encoding of subsequent bits in a current block when the image quality value of the current block crosses a threshold.

An image processing method according to another aspect of the present invention is a n image processing method that encodes each frame in an image data according to JPEG2000, and includes dividing each frame into a plurality of blocks; encoding bits in each block in a plurality of passes; calculating an image quality value of each pass; calculating an image quality value of each block based on the image quality value of each pass; and making the encoder skip encoding of subsequent bits in a current block when the image quality value of the current block crosses a threshold.

A computer-readable recording medium according to still another aspect of the present invention stores a computer program that causes a computer to execute the above method according to the present invention.

The other objects, features, and advantages of the present invention are specifically set forth in or will become apparent from the following detailed description of the invention when read in conjunction with the accompanying drawings.

DETAILED DESCRIPTION

Exemplary embodiments of an image processing apparatus, an image processing method, and a computer-readable recording medium according to the present invention will be explained below in detail with reference to the accompanying drawings.

Figure 8:
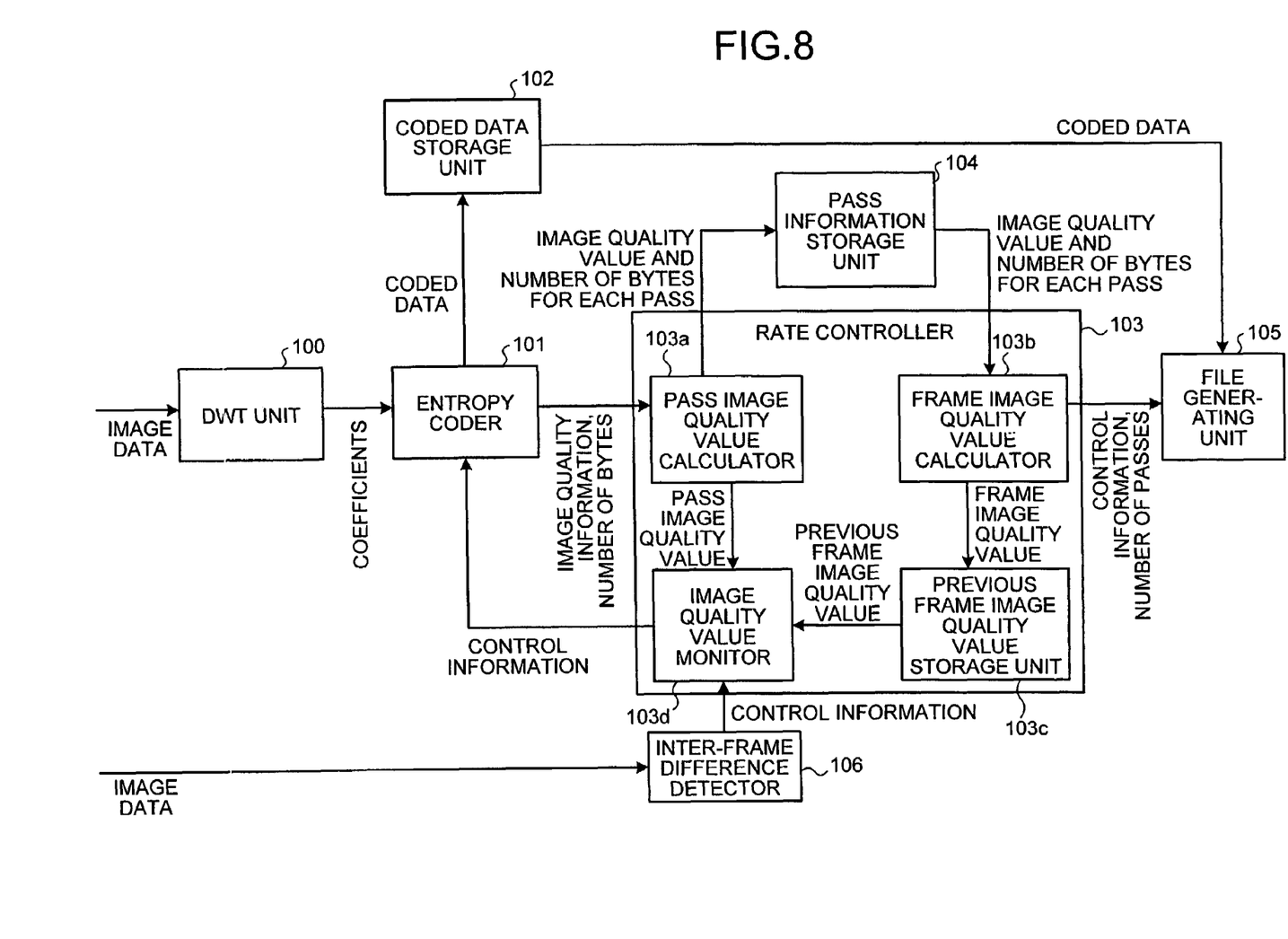
FIG. 8 is a schematic for explaining a functional configuration of an image processing apparatus according to an embodiment of the present invention.

The image processing apparatus according to the present invention is a macro in a digital video camera or the like, that encodes motion picture data according to JPEG2000. FIG. 8 is a schematic for explaining a functional configuration of the image processing apparatus. The functions of the respective units other than a rate controller 103 and an inter-frame difference detector 106 are the same as those of the units having the same name shown in FIG. 1 (that is, the same as the conventional technology). In the rate controller 103, the functions of a pass image quality value calculator 103a and a frame image quality value calculator 103b are the same as those of the respective units having the same name in FIG. 1. However, it is a characteristic point in the present invention that the rate controller 103 further includes a previous frame image quality value storage unit 103c and an image quality value monitor 103d.

The previous frame image quality value storage unit 103c holds an image quality value most recently calculated by the frame image quality value calculator 103b. Every time a new image quality value is output from the frame image quality value calculator 103b, the old image quality value in the previous frame image quality value storage unit 103c is overwritten, and hence, the previous frame image quality value storage unit 103c holds the image quality value of the frame encoded immediately before the current frame (hereinafter, "previous frame"). The image quality value herein is a value of block distortion, but the value of block distortion is only one example of the image quality value. Any value can be used as the image quality value, so long as the value functions as an index of the image quality.

The image quality value monitor 103d monitors the image quality value of the pass calculated by the pass image quality value calculator 103a, and instructs an entropy coder 101 to stop encoding of the currently processed code block (hereinafter, "current code block") when the image quality value of the current code block becomes less than the image quality value of the previous frame−α (α is a fixed value or a variable value standing for a margin).

Figure 2:
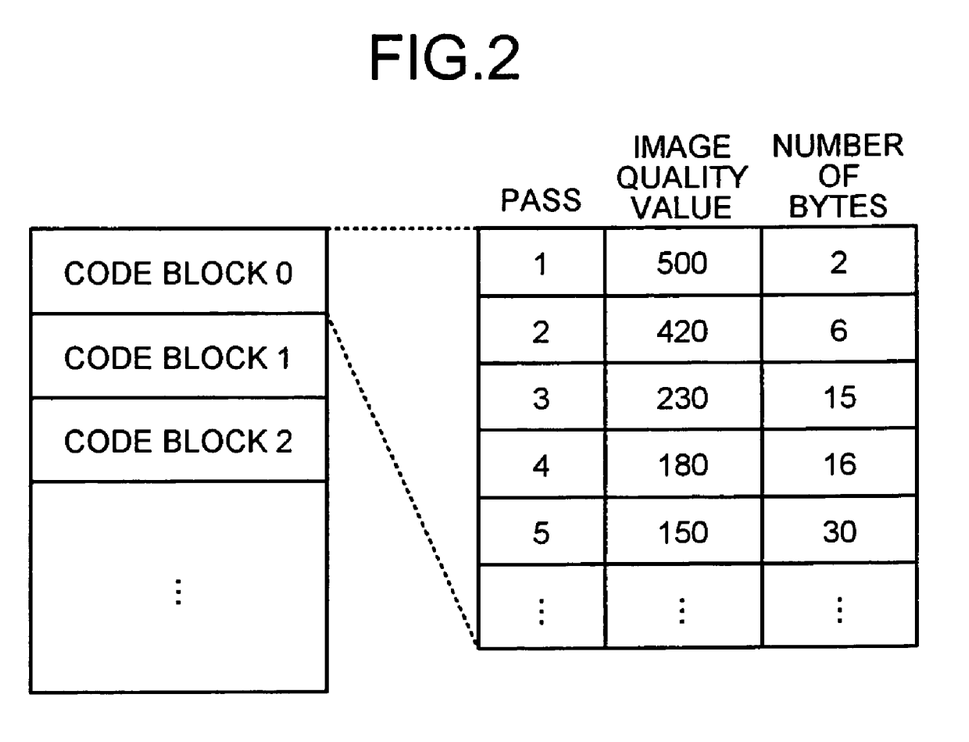
FIG. 2 is an example of an image quality value and the number of bytes of a pass.

For example, it is assumed that the image quality value of the previous frame, which makes the code amount of the previous frame closest to the target code amount, is calculated to be 300, and α is set to 100. When the image quality value of each pass in code block 0 of the current frame is as shown in FIG. 2, the image quality value of code block 0 is:

500 when being encoded up to pass 1;
420 when being encoded up to pass 2;
230 when being encoded up to pass 3; and
180 when being encoded up to pass 4.

Therefore, when the image quality value of pass 4 is input from the pass image quality value calculator 103a, the image quality value monitor 103d detects that the image quality value of code block 0 (specifically, 180) becomes less than the image quality value of the previous frame−α (specifically, 200), and instructs the entropy coder 101 to skip encoding of code block 0 to shift to encoding of the next code block 1. Accordingly, for the code block 0, only encoding of pass 1 to pass 4 is performed. In other words, the bits to be encoded in pass 5 and after are ignored.

Thus, in the embodiment, when the image quality value of the current code block of the current frame falls below the image quality value of the previous frame−α, which has achieved the target code amount and held in the previous frame image quality value storage unit 103c, encoding of subsequent passes of the current code block is omitted. This is because when there is not much difference between the previous frame and the current frame, it is expected that the image quality value of the current frame that achieves the target code amount is not so much different from that of the previous frame, and hence, the subsequent passes that can achieve a lower image quality value (in other words, higher image quality) than the previous frame are likely to be truncated after encoding.

However, when there is a difference between the previous frame and the current frame, for example, in the case of scene change, the image quality value of the current frame does not always approximate to that of the previous frame. In the embodiment, therefore, the inter-frame difference detector 106 is provided. When detecting a difference not smaller than a predetermined value between the previous frame and the current frame, the inter-frame difference detector 106 instructs the image quality value monitor 103d to stop monitoring of the image quality value of the current frame (the image quality value monitor 103d that does not perform the monitoring, does not instruct the entropy coder 101 to skip encoding processing, too). For the detecting method of the difference between frames used by the inter-frame difference detector 106, various methods heretofore proposed can be employed.

In the right hand side of the above expression, α is subtracted from the image quality value of the previous frame because the image quality value, which is the value of block distortion in the embodiment, decreases as the image quality increases. However, if the image quality value increases as the image quality increases, α is added to the image quality value of the previous frame. Therefore, the above expression can be generally written as "the image quality value of the current code block<the image quality value of the previous frame±α". When the image quality value of the current code block falls below or exceeds the image quality value of the previous frame by α, the image quality value monitor 103d instructs the entropy coder 101 to skip encoding of subsequent passes in the code block. The above expression is only an example for comparing the difference between the image quality value of the current frame and that of the previous frame, and any other expression can be used, so long as the comparison is possible.

Figure 9:
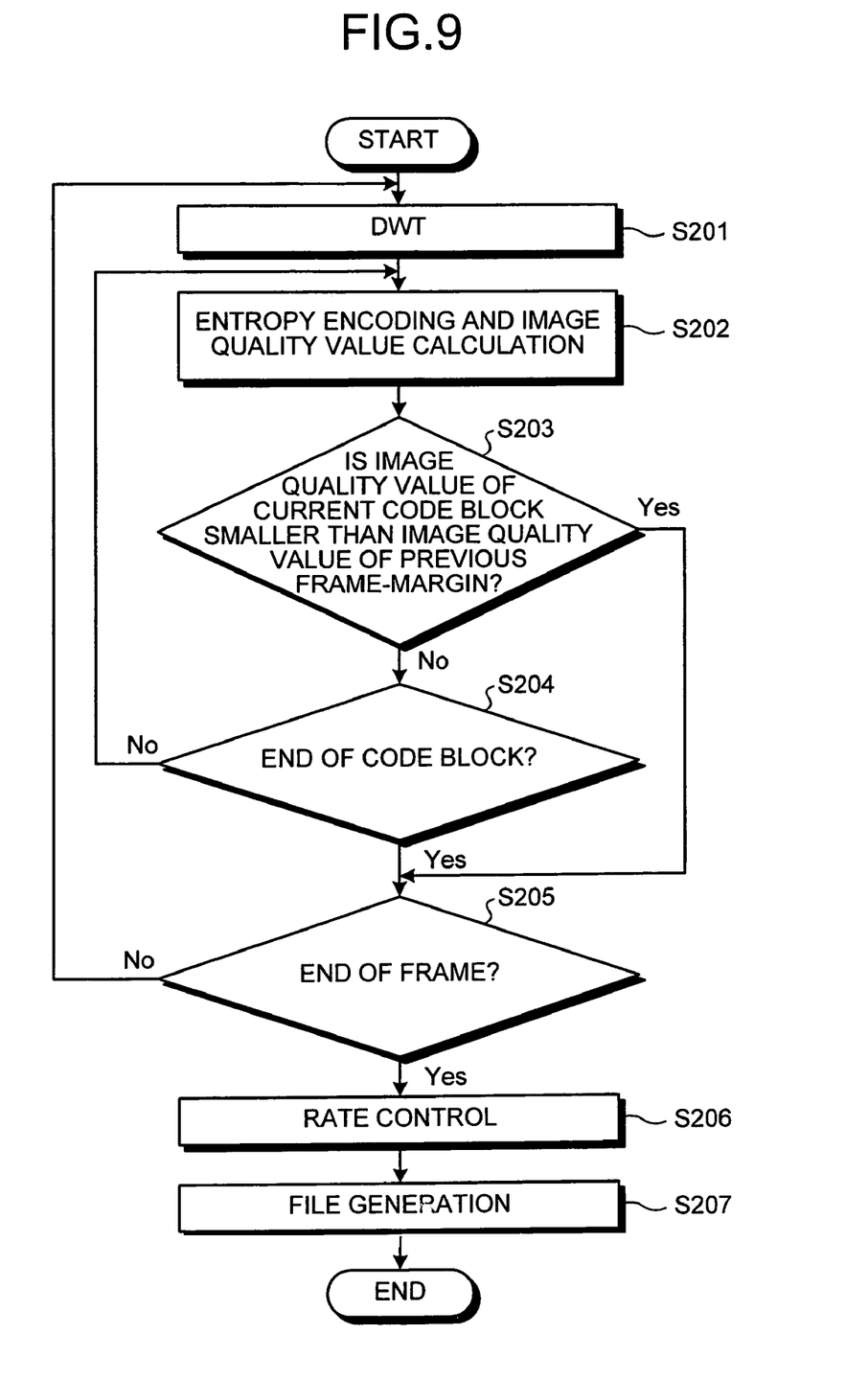
FIG. 9 is a flowchart of a procedure in encoding processing of image data by the image processing apparatus according to the embodiment.

FIG. 9 is a flowchart of a procedure in encoding processing of image data by the image processing apparatus according to the embodiment of the present invention. At first, the image data after pre-processing is transformed by a DWT unit 100 (step S201). The transformed data (coefficients) is then divided into code blocks by the entropy coder 101, and bits in each bit plane in each code block is encoded in each pass and stored in a coded data storage unit 102. At the same time, the pass image quality value calculator 103a of the rate controller 103 calculates the image quality value of each pass, and the calculated image quality value is stored in the pass information storage unit 404 together with the number of bytes of each pass (step S202).

The image quality value monitor 103d of the rate controller 103 compares the image quality value of the current code block with that of the previous frame−α, and so long as the former is larger than the latter, and there is an unperformed pass in the code block (step S203: No, and step S204. No), control returns to step S202 to continue encoding of the code block. On the other hand, when the former falls below the latter (step S203: Yes), similar processing is performed for the next code block.

After finishing the processing at steps S201 to S204 for all code blocks in one frame (step S205: Yes), the frame image quality value calculator 103b of the rate controller 103 performs rate control (step S206) to specify the image quality value of the current frame to make the code amount of the frame closest to the target code amount; and number of passes to be left in each code block to achieve the image quality value.

The image quality value obtained here is stored in the previous frame image quality value storage unit 103c. A file generating unit 105 then generates a JPEG2000 file (step S207) in which only the passes determined to be left at step S206 are incorporated.

As compared to FIG. 4 depicting the conventional technology, the characteristic point in FIG. 9 is step S203 inserted to the encoding loop of each code block, where the image quality value of the current code block is monitored, and when it falls below the image quality value of the previous frame−α, control leaves the loop to finish encoding of the current code block halfway.

Figure 10:
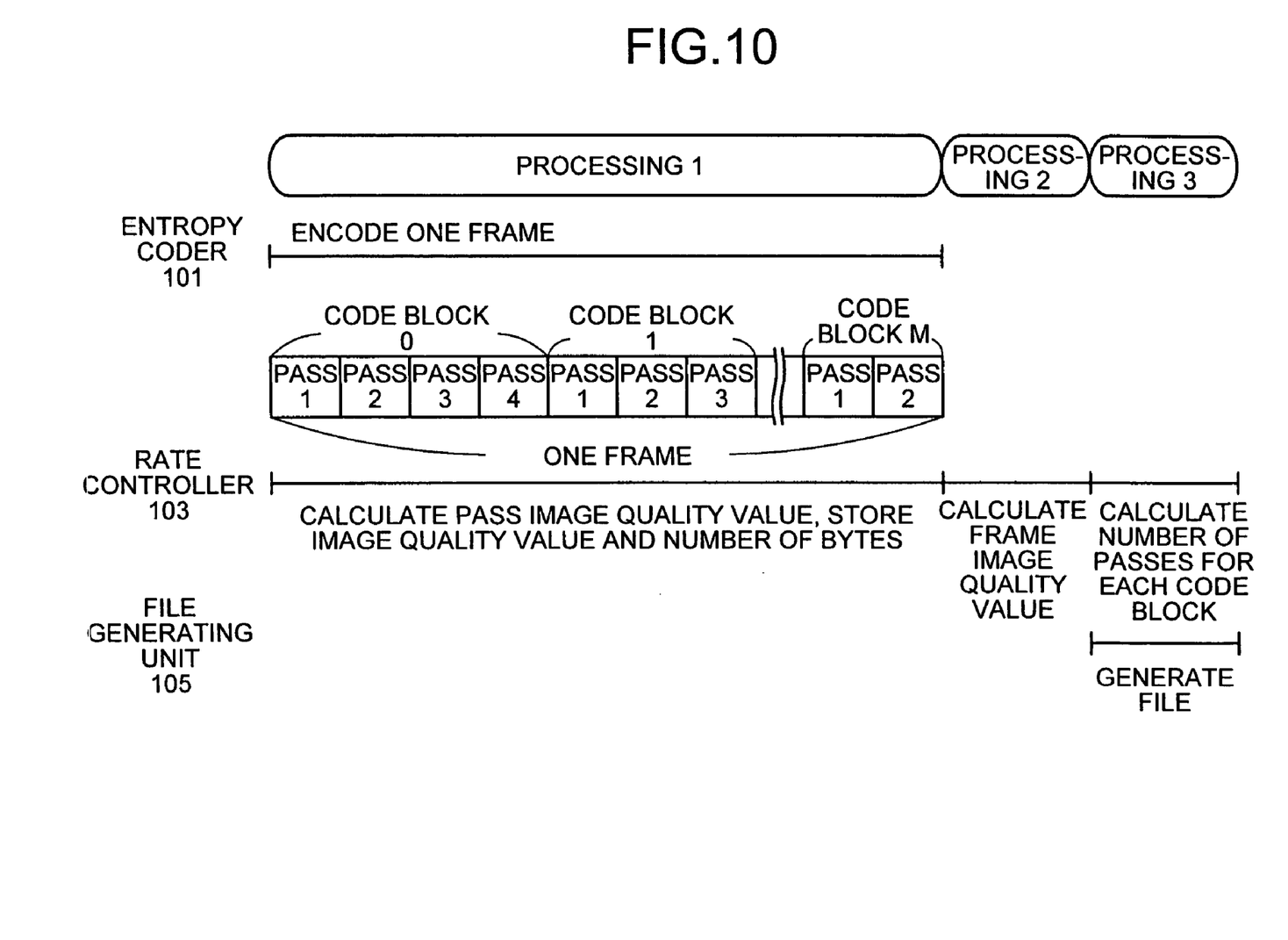
FIG. 10 is a timing chart of the encoding processing of image data in the image processing apparatus according to the embodiment.

FIG. 10 is a timing chart of the encoding processing of the image data in the image processing apparatus according to the embodiment of the present invention. The timing of each processing is the same as that of the conventional technology shown in FIG. 5. In FIG. 10, however, in contrast with FIG. 5 in which all bits in the code block are encoded, encoding of the current code block, which is sequentially performed from the bit having a large contribution to the image quality, is skipped to shift to the next code block, when it becomes certain that subsequent passes of the current code block will be eventually truncated even if they are encoded. Accordingly, the number of passes to be processed in the processing 1 decreases as compared to that in FIG. 5. For example, in FIG. 10, only four passes (from pass 1 to pass 4) of the passes of the code block 0 are encoded.

According to the embodiment, the passes, which are surely truncated eventually (which are not incorporated in the file) by the file generating unit 105 in the subsequent stage, are not encoded by the entropy coder 101 in the previous stage. Accordingly, reduction of the processing time and reduction of power consumption in the circuit can be realized.

In the embodiment, the truncation point in each code block is determined based on the image quality value calculated for the previous frame, but the image quality value used as the basis for determination is not limited to the image quality value of the previous frame.

For example, by statistically collecting image quality values of a frame when the target code amount is a certain value (in other words, when the compression ratio is a certain value), and by comparing this value±α with the image quality value of the current frame, the encoding can be skipped. For example, if it is determined that up to the tenth passes are to be encoded for each code block, "the number of code blocks in one frame×10 (words)" will be sufficient as the capacity of a pass information storage unit 104, thereby reducing the memory to be installed. It depends on not only the code amount (compression ratio) but also other factors (such as color component, resolution, and resolution component) that how many passes are necessary for one code block. Therefore, by determining the number of passes by also taking these factors into consideration, the precision is improved and truncation of passes necessary for the subsequent stage is prevented.

The image processing method explained in the embodiment can be realized by a program prepared in advance. The program is recorded on a computer readable recording medium such as read only memory (ROM), hard disk, flexible disk, CD-ROM, magneto-optical (MO), or digital versatile disk (DVD), and read out from the recording medium by a processor and executed. The program can be a transmission medium that can be distributed via a network such as the Internet.

According to the image processing apparatus, the image processing method, and the computer-readable recording medium according to the present invention, data that is surely to be discarded after encoding is not encoded. Accordingly, there is the effect that the efficiency of the processing is improved, and reduction of the processing time and of the power consumption can be realized.

Although the invention has been described with respect to a specific embodiment for a complete and clear disclosure, the appended claims are not to be thus limited but are to be construed as embodying all modifications and alternative constructions that-may occur to one skilled in the art which fairly fall within the basic teaching herein set forth.

What is claimed is:

1. An image processing apparatus that encodes each frame in an image data according to JPEG2000, comprising:
   a dividing unit that divides each frame into a plurality of blocks;
   an encoder that encodes bits in each block in a plurality of passes;
   a first image quality value calculator that calculates an image quality value of each pass;
   a second image quality value calculator that calculates an image quality value of each block based on the image quality value of each pass; and
   an encoder controller that makes the encoder skip encoding of subsequent bits in a current block when the image quality value of the current block crosses a threshold.

2. The image processing apparatus according to claim 1, further comprising:
   a third image quality value calculator that calculates an image quality value of the frame which makes code amount of the frame close to a predetermined value;
   a number calculator that calculates number of passes required for each block to achieve the image quality value of the frame; and
   an output unit that outputs only the number of passes for each block.

3. The image processing apparatus according to claim 2, wherein the threshold is an image quality value of a previous frame calculated by the third image quality value calculator.

4. The image processing apparatus according to claim 3, wherein the encoder controller does not make the encoder skip the encoding when an image data of the current frame is substantially different from an image data of the previous frame.

5. An image processing method that encodes each frame in an image data according to JPEG2000, comprising:
   dividing each frame into a plurality of blocks;
   encoding bits in each block in a plurality of passes;
   calculating an image quality value of each pass;
   calculating an image quality value of each block based on the image quality value of each pass; and making the encoder skip encoding of subsequent bits in a current block when the image quality value of the current block crosses a threshold.

6. The image processing method according to claim 5, further comprising:
calculating an image quality value of the frame which makes code amount of the frame close to a predetermined value;
calculating number of passes required for each block to achieve the image quality value of the frame; and
outputting only the number of passes for each block.

7. The image processing method according to claim 6, wherein the threshold is an image quality value of a previous frame calculated by the third image quality value calculator.

8. The image processing method according to claim 7, wherein the encoder controller does not make the encoder skip the encoding when an image data of the current frame is substantially different from an image data of the previous frame.

9. A computer-readable recording medium that stores a computer program that causes a computer to encode each frame in an image data according to JPEG2000, the computer program causing the computer to execute:
dividing each frame into a plurality of blocks;
encoding bits in each block in a plurality of passes;
calculating an image quality value of each pass;
calculating an image quality value of each block based on the image quality value of each pass; and
making the encoder skip encoding of subsequent bits in a current block when the image quality value of the current block crosses a threshold.

10. The computer-readable recording medium according to claim 9, wherein the computer program further causing the computer to execute:
calculating an image quality value of the frame which makes code amount of the frame close to a predetermined value;
calculating number of passes required for each block to achieve the image quality value of the frame; and
outputting only the number of passes for each block.

11. The computer-readable recording medium according to claim 10, wherein the threshold is an image quality value of a previous frame calculated by the third image quality value calculator.

12. The computer-readable recording medium according to claim 11, wherein the encoder controller does not make the encoder skip the encoding when an image data of the current frame is substantially different from an image data of the previous frame.

* * * * *